Feb. 23, 1965  E. CREPEAU ETAL  3,170,373
TOOL FOR SCRAPING AND SMOOTHING PLASTIC AND METAL SURFACES
Filed May 2, 1962

INVENTORS
Ernest CREPEAU
Stanislas LAPIERRE

BY Pierre Lespérance

PATENT AGENT 3,170,373
TOOL FOR SCRAPING AND SMOOTHING PLASTIC AND METAL SURFACES
Ernest Crepeau, 53 Youville Blvd., Chateauguay, Quebec, Canada, and Stanislas Lapierre, 456 Ch. Lac St.-Louis, Lower Woodland, Quebec, Canada, assignors of thirty-three and one-third percent to Jeanne Dagenais née Deschamps, Chateauguay, Quebec, Canada
Filed May 2, 1962, Ser. No. 191,809
7 Claims. (Cl. 90—12)

The present invention relates to a portable power tool to be used in connection with auto body work and more particularly to a power tool for scraping and smoothing the plastic and/or metal surfaces of the repaired portions of an automobile body prior to painting the same.

The conventional way of scraping and smoothing out repaired surfaces of automobile bodies before painting the same, consists of using sand paper and files. This is a time consuming operation and moreover it produces considerable dust and the sand paper must be replaced very often.

Consequently, the general object of the present invention resides in the provision of a portable power tool for scraping and smoothing out plastic and/or metal surfaces of automobile bodies and the like, which considerably accelerates the scraping and smoothing out operation as compared to the conventional methods for carrying out said operation.

Another important object of the present invention resides in the provision of a portable power tool of the character described which does not produce any dust during scraping and smoothing out.

Another important object of the present invention resides in the provision of a portable power tool of the character described using a rotary high speed cutter, the cutter bits of which are made of carbide steel or similar high speed alloy which can be easily sharpened when worn out and which will give a very long service without replacement.

Another important object of the present invention resides in the provision of a power tool of the character described provided with means for guiding the power tool over curved surfaces of an automobile body.

Yet another important object of the present invention resides in the provision of a power tool of the character described in which means are provided for easily adjusting the level of the cutter bits with respect to the guiding plate of the tool.

The foregoing and other important objects of the present invention will become more apparent during the following disclosure and by referring to the drawings, in which.

Figure 1:
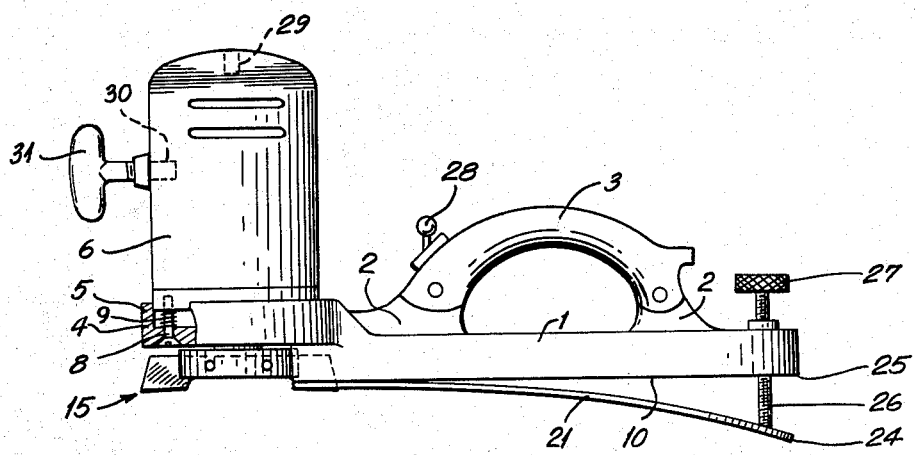
FIGURE 1 is a side elevation of the tool of the present invention.
Figure 4:
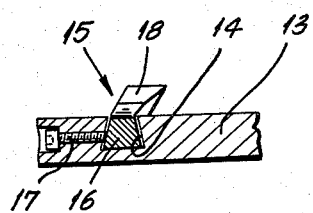
FIGURE 4 is a partial cross-section of the rotary cutter.
Figure 3:
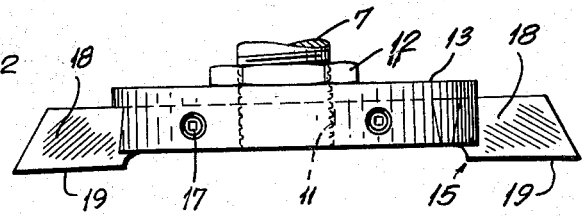
FIGURE 3 is an enlarged side elevation of the rotary cutter.
Figure 2:
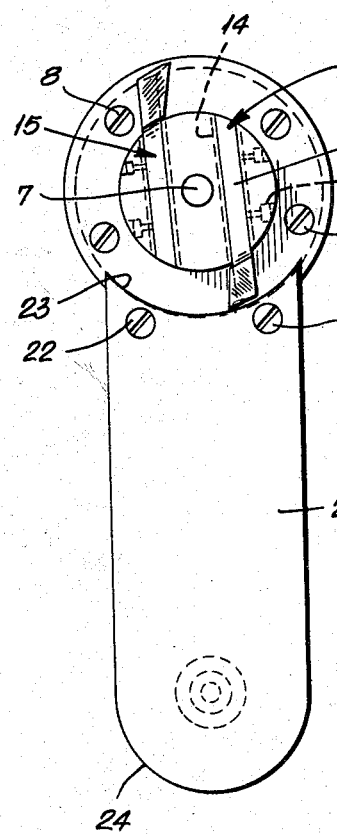
FIGURE 2 is a bottom plan view of the same.

Referring now more particularly to the drawings in which like reference characters indicate like elements throughout, the tool of the present invention comprises an elongated substantially flat base frame 1 preferably made of a casting of aluminum or the like light weight metal, having spaced upstanding ears 2 to which is secured a handle 3. Base frame 1 is provided at its front end with a circular extension 4 having a peripheral upwardly extending flange 5 and to which is secured a cylindrical housing 6 for an electric motor (not shown). The shaft 7 of the rotor of the electric motor extends through an opening made in the extension 4. Housing 6 is adjustably secured to extension 4 by means of bolts 8 freely passing through holes made in extension 4 and in threaded engagement with the lower portion of housing 6 and with the interposition of coil springs 9 surrounding the bolts 8 and abutting against the lower face of housing 6 and the top face of extension 4. The lower face of extension 4 is parallel to and spaced upwardly from the lower flat imperforate face 10 of base frame 1.

The lower free end 11 of shaft 7 is threaded and is backed with a nut shaped integral flange 12. A solid disc 13 is screwed on threaded portion 11 of shaft 7 and abuts against flange 12. Disc 13 is parallel to and slightly spaced downwardly from the bottom face of circular extension 4.

A pair of parallel slots 14 of dovetailed cross section are formed in the lower face of disc 13 and are equally spaced on each side of the rotational axis of the disc 13.

A pair of cutter bits 15 are rigidly secured to the disc 13 by engaging the slots 14. Each cutter bit 15 consists of a shank 16 of dovetailed cross section slidably fitted within the slot 14 and firmly secured in position by lateral set screws 17 threadedly engaging bores made in disc 13 and abutting against the shank 16. Each cutter bit 15 has a head 18 integral with shank 16 and protruding outwardly from the peripheral face of the disc 13; each head 18 forms a cutting edge 19 and the two cutting edges lie in a common plane parallel to and spaced downwardly from the lower face of the disc 13.

The front edge of the base frame 1 is concave to make room for the heads 18 of the cutter blades 15 during their circular movement.

A flexible resilient blade 21 of relatively thin gauge is secured by bolts 22 at its front portion to the front portion of the underface 10 of base frame 1. Blade 21 has a shape and dimensions corresponding to said undersurface 10 with a concave front edge 23 corresponding to the front edge of base frame 1 and a rounded rear edge 24 corresponding to the rounded rear edge 25 of base frame 1; except for its attachment by bolts 22, the resilient blade 21 is free of the base frame 1. Its rear end portion is engaged by an adjustable screw 26 which is threaded through the rear end portion of the base frame 1 and protrudes downwardly from the lower face 10 of base frame 1. Adjustable screw 26 is manually adjusted by turning its knurled head 27.

An electric switch 28, preferably mounted on the front portion of handle 3, controls the electric motor of the tool.

The housing 6 of the electric motor is provided with a top threaded bore 29 and a lateral threaded bore 30 for threadedly receiving the threaded stem of a hand grip 31 which can thus be secured in any one of two selected positions, in which it will project either laterally forwardly from the tool or from the top of the housing 6.

The tool of the present invention is used as follows: The cutter bits 15 and flexible resilient blade 21 are positioned on the metal or plastic surface to be scraped and smoothened out and the screw 26 is secrewed in or unscrewed in order to adjust the curvature of the resilient blade 21 to correspond to the curvature of the surface portion to be scraped and smoothened out. Then the electric motor is started by means of switch 28, whereby the rotating cutter bits 15 scrape the plastic or metal in the form of chips similar to those obtained with a plane when smoothing out wood, but of a smaller size. The tool is held with the hands by means of handle 3 and hand grip 31. After one or more passes have been effected in a given surface area of similar curvature, the motor is stopped and the screw 26 is again adjusted to curve the resilient blade 21 in accordance with an adjacent surface portion of another curvature. The smoothing out operation is then repeated on this new surface portion.

The depth of cut is easily adjusted by screwing or unscrewing the spring pressed bolts 8 which serve to space more or less the motor housing 6 from extension 4 and consequently to adjust the level of the rotary disc 13 and cutting edges 19 of the cutter bits 15 with respect to the underface of the attached portion of the resilient blade 21. The adjustment is selected such as to have the cutting edges 19 substantially in the plane of the lower surface of said attached portion of the resilient blade 21.

The cutting edges 19 are easily sharpened by simply unscrewing the set screws 17 and removing the entire cutter bits 15 for sharpening on a suitable grinding wheel. If desired, the whole cutter disc 13 can be unscrewed from shaft 7 by holding nut shaped flange 12 against rotation.

It has been found that the device of the present invention is very fast in operation and does not produce any dust. It is especially efficient on the type of plastic repairs which are made to bodies of automobiles and which are very hard to file down with an ordinary file or with sand paper.

The power tool of the invention is also efficient on any other metal surfaces, such as lead, galvanized iron and the like, normally used in body work.

While a preferred embodiment in accordance with the present invention has been illustrated and described, it is understood that various modifications may be resorted to without departing from the spirit and scope of the appended claims.

What we claim is:

1. A portable power tool for scraping and smoothing out metal and plastic surfaces of variable curvatures comprising an elongated base frame having an extension at one end thereof, a power driven rotary cutter carried by said end extension, a flexible resilient blade extending underneath said base frame and secured thereto adjacent said rotary cutter and free of said base frame for the major portion of said resilient blade and base frame, and adjusting means mounted at the end of said base frame opposite said extension, engageable with said resilient blade for varying the radius of curvature of the same.

2. A portable power tool as claimed in claim 1, wherein said adjusting means consist of a manually rotatable screw in threaded engagement with said base frame and passing through the same and having one end abutting against said resilient blade at the fere end portion thereof.

3. A portable power tool as claimed in claim 1, wherein said power driven rotary cutter is adjustably secured to said extension to adjust the level of said rotary cutter with respect to the underface of said resilient blade.

4. A portable power tool comprising a base frame of elongated shape having a flat continuous underface, a handle secured to said base frame and protruding upwardly therefrom at the top face thereof, a flexible resilient blade secured at one end to one end of the underface of said base frame and free therefrom over the remaining portion of said underface and flexible blade, an adjusting screw threadedly engaging and pasing through the opposite end of said base frame and engageable with the free end portion of said blade to vary the radius of curvature of said blade, an extension integral with said base frame and protruding from the end thereof to which said resilient blade is attached, said extension being in circular form and having its underface lying in a plane parallel to and spaced upwardly from the underface of said base frame, an electric motor mounted on said tool and having a motor shaft passing through said extension, a disc secured to said shaft under said extension, cutter bits removably secured to said disc and having cutting edges lying in a common plane at substantially the level of said resilient blade in the region of said blade attached to said base frame, said cutting edges lying in a plane spaced downwardly from said rotary disc.

5. A portable power tool as claimed in claim 4, including means for adjustably securing said motor to said extension for varying and adjusting the level of the cutting edges of said cutter blades with respect to said resilient blade.

6. A portable power tool as claimed in claim 5, wherein said means for adjustably securing said motor to said extension include bolts freely passing through said extension and threadedly engaging the housing of said motor, and coil springs surrounding said bolt and abutting against said motor housing and said extension.

7. A portable power tool as claimed in claim 4, further including a hand grip removably secured to the housing of said motor.

References Cited in the file of this patent
UNITED STATES PATENTS

| | | |
|---|---|---|
| 864,403 | Beck | Aug. 27, 1907 |
| 1,581,720 | Carter | Apr. 20, 1926 |
| 2,544,841 | La Fontaine | Mar. 13, 1951 |
| 2,746,499 | Greeley | May 22, 1956 |